United States Patent [19]
Eckert

[11] 3,806,912
[45] Apr. 23, 1974

[54] GRAPHICAL INPUT BOARD

[75] Inventor: Edward R. Eckert, West Conshohocken, Pa.

[73] Assignee: Burroughs Corporation, Detroit, Mich.

[22] Filed: June 13, 1972

[21] Appl. No.: 262,194

[52] U.S. Cl. ................ 340/347 R, 178/18, 33/1 M, 33/23 J
[51] Int. Cl. ........................................... H03k 13/00
[58] Field of Search...... 340/347 AD, 347 P, 347 R; 235/61.6 A; 33/1 M, 23 J; 178/18, 19, 20

[56] References Cited

UNITED STATES PATENTS

| | | | |
|---|---|---|---|
| 2,527,835 | 10/1950 | Miller | 178/19 |
| 3,304,612 | 2/1967 | Proctor et al. | 33/1 M |
| 2,975,235 | 3/1961 | Leitner et al. | 178/18 |
| 3,286,028 | 11/1966 | Gray et al. | 178/18 |
| 3,624,619 | 11/1971 | Ambrosio | 340/347 P X |
| 3,668,313 | 6/1972 | Dym | 178/19 |
| 3,128,458 | 4/1964 | Romero | 178/18 X |
| 3,399,401 | 8/1968 | Ellis et al. | 178/18 X |

*Primary Examiner*—Charles D. Miller
*Attorney, Agent, or Firm*—Kenneth Watov; Charles S. Hall; Edward G. Fiorito

[57] ABSTRACT

A graphical input board and related detection circuitry for determining, and generating both digital and analog outputs representing, the instantaneous coordinate position of a non-captive stylus being moved upon the writing surface of the board. The smooth graphic input surface of the board comprises a printed circuit including a plurality of uniform parallel conductive and resistive paths, a resistive path lying between a pair of conductive paths, the width and spacing of the paths being structured for bridging of three paths by a conductive end of the stylus at any position on the writing surface of the board. The parallel resistive paths are grounded at one end, while like ones of each of the pairs of parallel conductive paths juxtaposed to the resistive paths are resistively interconnected by proportional resistances, at the opposite side from the grounded ends of the parallel resistive paths, also to ground. The other parallel conductive paths are interconnected to detection circuitry for driving a positive and negative pulse train into the board, for detecting and converting to digital coded signals the analog voltages corresponding to the coordinates on the board where the stylus is positioned, and for outputting both analog and digital signals.

21 Claims, 3 Drawing Figures

GRAPHICAL INPUT BOARD

BACKGROUND OF THE INVENTION

This invention relates generally to graphical display board devices, and specifically to the generation and detection of coordinate signals, representing the instantaneous position of a stylus either being moved or held stationary upon the board. In general, the invention provides analog and digital coordinate signals, being compatible with analog or digital equipment, but its primary use is for interconnection to digital control and computation systems. The invention further permits an operator to input graphical data directly into a computer, as the data is being generated, for presentation on a cathode ray tube and/or for computation or storage.

Prior art devices have been hampered by various combinations of certain deficiencies, including high cost, limited resolution, difficulty of manufacture, restricted mechanical handling, slow response time, lack of optical positional feedback to the operator, a non-uniform writing surface, and a captive stylus. In attempting to solve the aforementioned deficiencies, such devices have employed planar resistive sheets as a writing surface, wherein resistive bridge networks are connected to various points along the sheet, for the purpose of driving current through the sheet, producing electric fields upon the sheet which are detected by a captive stylus pickup and fed to detection circuitry. Similar devices have employed sinusoidal voltages of different frequencies, and demodulation techniques in the detection stages. Such devices are inherently difficult to manufacture, require complex detection equipment, and necessitate the use of a captive stylus.

In addition to resistive sheets, woven wire writing surfaces have been employed. This type of surface is inherently rough and difficult to manufacture with precise spacing of the interwoven wires. The position of the captive stylus upon the mesh has been detected by the charging and discharging of capacitors or by employing modulation and demodulation circuitry. Problems inherent in such devices are that a captive stylus interferes with the natural movements involved in writing or drawing; and the charging and discharging of the capacitors limit the system capability to respond to rapid, successive and major positional changes of the stylus. Most prior art devices are also limited to outputting analog voltage levels representative of the coordinate position of the stylus.

SUMMARY OF THE INVENTION

Accordingly, with these prior art problems in mind, the invention contemplates the solution of these problems by a simplified graphical input board having a smooth writing surface, high resolution, and ease of manufacture.

It is an object of this invention to develop a simplified graphical input board and associated circuitry utilizing a non-captive stylus to achieve unrestricted freedom of writing and drawing.

It is a further object of this invention to simplify driving and detection circuitry for use with a graphical input board.

A still further object is to provide detection circuitry capable of outputting both analog and digital signals representative of the instantaneous stylus position upon the surface of a graphic input board.

Another object is to provide infinite resolution in one coordinate value and finite resolution in the other.

These and other objects and advantages are accomplished in an apparatus including a printed circuit graphical input board having a plurality of parallel, equally spaced apart, conductive paths and uniform resistive paths, a resistive path lying between a pair of conductive paths. The resistive paths are grounded at interconnected like ends, and like ones of each pair of conductive paths are interconnected at one end by proportional resistances forming a series resistive path to ground. The other ones of the pairs of conductive paths are connected to detection circuitry including a positive and negative pulse train generator, and to analog/-digital logic. The surface of the board presents a smooth writing surface to a non-captive writing stylus having an electrically conductive writing tip for continuous bridging of not less, or more, than three paths, wherein the coordinate position of the stylus upon the board is sensed by the associated logic circuitry providing both analog and digital output signals representing the instantaneous positioning of the stylus upon the board.

BRIEF DESCRIPTION OF THE DRAWINGS

The foregoing objects and advantages of the invention, together with other advantages which may be attained by its use, will be apparent from the following detailed description of the invention read in conjunction with the drawings.

In the drawings, wherein like numerals identify corresponding parts.

DETAILED DESCRIPTION OF THE INVENTION

Figure 1:
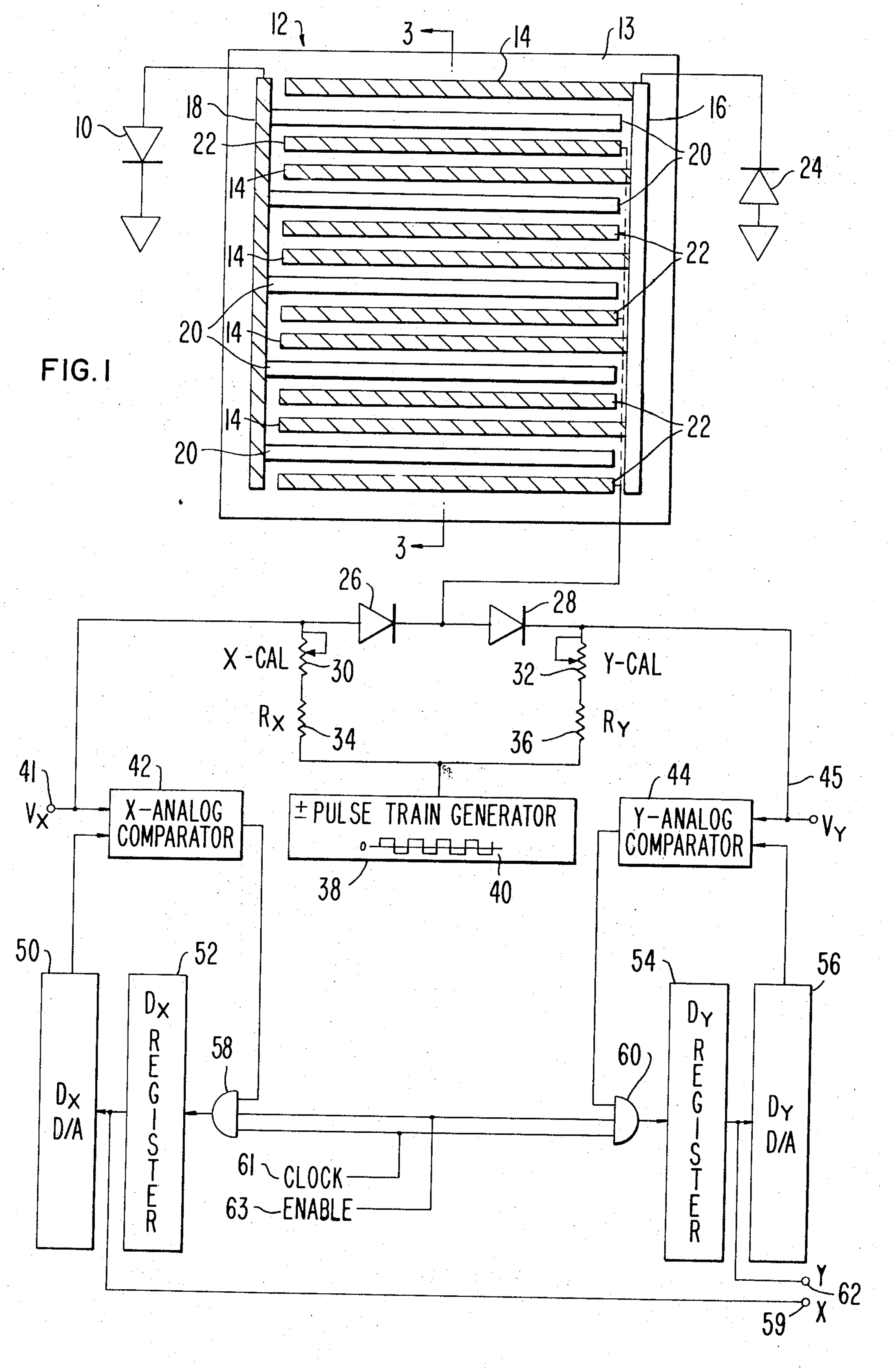
FIG. 1 is a combined plan view of a graphic display board of the invention, and a schematic reproduction of the detection circuitry with its interconnections to the board.

The graphical input board apparatus of the invention includes two main intercooperating subassemblies; one subassembly is the graphical display board 12 of FIG. 1; the other subassembly is the detection circuitry of FIG. 1. The graphic display board 12 has a plurality of uniform parallel resistive paths 20, equally spaced from one another, each being perpendicular to and connected at an end to a conductive path 18, the path 18 being connected to the anode of a first current steering diode 10, the cathode of the diode 10 being connected to ground.

Located between successive parallel resistive paths 20 and equally spaced therefrom are first and second parallel conductive paths 22, 14, the first path being designated as an X-Tab 22, and the second as a Y-Tab 14. Each of the conductive paths 14, 22 is juxtapositioned to a resistive path 20 and has the same relative relationship thereto. The plurality of X-Tabs 22 are interconnected to one another and to the junction of the cathode and anode of a pair of isolating diodes 26, 28, the diodes being part of the detection circuit. An end of each Y-Tab 14 is perpendicular to and connected to a resistive path 16, providing proportional resistances between the first conductive paths 14, with one end of the resistive path 16 being terminated through a current steering diode 24, the anode of diode 24 being connected to ground.

The previously described resistive and conductive paths are mounted upon a suitable rigid non-conductive sheet-like substrate material 13, the combination comprising a printed circuit board, the process of manufacture and required materials being well-known in printed circuit technology. As a result of applying printed circuit technology to the manufacture of the graphic display board 12, a smooth writing surface and dimensionally accurate conductive and resistive paths can be readily attained.

As shown in FIG. 1, the detection circuitry is mainly symmetrical with respect to the X and Y coordinate channels. A pulse train generator 38 provides a source of positive and negative rectangular pulses 40, the pulse train generator output being connected to an end of each of a pair of fixed resistors 34, 36. The other ends of the resistors 34, 36 are connected, respectively, to variable resistors 30, 32. One variable resistor 30 is used to calibrate the X-analog channel, whereas the other variable resistor 32 is used to calibrate the Y-analog channel. The other end of the first variable resistor 30 is connected to the anode of the diode 26, a $V_x$ analog voltage output terminal 41, and to one input of an X-analog comparator 42. The other end of the second variable resistor 32 is connected to the cathode of the diode 28, a $V_y$ analog output terminal 45, and to one input of a Y-analog comparator 44.

The outputs of the X-analog comparator 42 and the Y-analog comparator 44 serve, respectively, as inputs of a pair of AND gates 58, 60, the outputs of which are fed, respectively, into a $D_x$ register 52 and a $D_y$ register 54. The outputs of the $D_x$ and $D_y$ registers 52, 54 serve, respectively, as inputs to the $D_x$ digital to analog converter (D/A) 50 and the $D_y$ (D/A) 56, the outputs of which serve, respectively, as second inputs to the X- and Y-analog comparators 42, 44; in addition the outputs of $D_x$ and $D_y$ registers 52, 54 are, respectively, fed to X and Y position digital output terminals 59, 62.

Clock and enable lines 61, 63 are, respectively, connected to second and third input lines of the two AND gates 58, 60. Thus, the X-position and Y-position detection channels are identical except that the two diodes 26, 28 are interwired for passing pulses of opposite polarity. In other words, diode 26 permits positive current to flow, whereas diode 28 permits negative current to flow between the pulse train generator 38 and the board 12, each diode also serving to electrically isolate the X and Y channels or sections of the detection circuitry, respectively.

Figure 2:
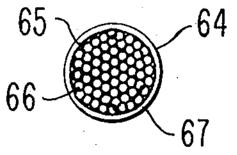
FIG. 2 is an end view of the conductive writing tip of a stylus suitable for writing upon the graphic display board of FIG. 1.
Figure 3:
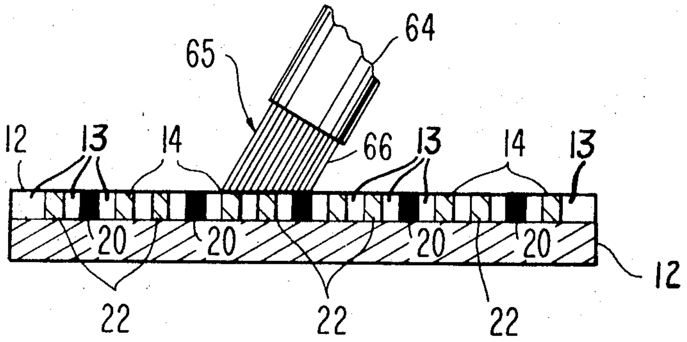
FIG. 3 is a transverse sectional view of the display board taken along line 3—3 of FIG. 1, combined with a partial side view of the stylus of FIG. 2, the conductive tip of the stylus being shown in contact with the board.

The conductive tip 65 of the writing stylus 64, shown somewhat enlarged in FIG. 2, is preferably composed of fine spring wires 66, the wires 66 being bound tightly together by an outer jacket 67 to form stylus body 64 (FIG. 3). The operating end of the conductive tip 65 is preferably beveled for easy manual use.

An illustration of the manner in which the metallic tip 66 of the stylus 64 contacts a resistive path 20 and two conductive paths 14, 22 of the graphic display board 12, is shown in FIG. 3. At any given time, the total width of the tightly interconnected stylus tip wires 65 always bridges two conductive paths 14, 22 and a resistive path 20, wherein the resistive path 20 may lie between or on either side of the conductive paths 14, 22, thus electrically interconnecting the bridged paths through the low ohmic resistance of the wires 66. As would be apparent to one skilled in the art, conductively tipped styli of many differing designs could be used in place of the stylus 64, illustrated herein.

The combination of the graphical display board 12 and detection circuitry of FIG. 1 permits a non-captive stylus to be used. All that is required is that the stylus tip be conductive and of a width to bridge or electrically interconnect, as previously described, two conductive paths 14, 22 and a resistive path 20, and no more, when the tip contacts the writing surface of the display board 12. Natural and unimpeded writing and drawing upon the surface of the graphical display board is accomplished through the use of the non-captive stylus 64.

As a result of the geometry of the resistive and conductive paths, infinite resolution is provided in the X-coordinate by the plural resistive strips 20; and finite resolution in the Y-coordinate, due to the interconnection of resistive strip 16 with the plural conductive strips 14. When stylus tip 66 is in contact with the writing surface of the display board 12, the contacted X-tab 22 interconnects the detection circuitry to the stylus tip 66, which in turn interconnects directly to a point on one of the plural resistive paths 20 representing the X-coordinate value, and by way of the contacted Y-tab 14 to a point on resistive path 16 representing the Y-coordinate value.

When pulse train 40 is in a positive-going transition, and the stylus tip wires 66 are contacting the operative surface of the graphic display board 12, a positive current will flow from pulse train generator 38, through the series circuit comprising resistors 34 and 30, diode 26, and into the X-tab or conductive path 22 being contacted by stylus tip wires 66. The current will then flow through stylus tip wires 66 into and through that portion of the associated resistive path 20 located between conductive path 18 and the stylus tip 65, into and through conductive path 18 and diode 10 to ground. No positive current will flow through the Y-channel associative conductive and resistive paths, and detection circuitry, due to the back biasing of diodes 24 and 28, during positive going transitions of pulse train 40.

The current through the X-channel path will cause a voltage drop representative of the X-coordinate position of the stylus 64 to occur between the anode of the X-channel diode 26 and ground, and measurable at analog output terminal 41 as $V_x$. The forward biased voltage drops of X-channel diode 26 and grounding diode 10 are negligible, as compared to the voltage occurring across the resistance of that section of resistance path 20 lying between conductive strip 18 and the contact point of stylus tip 65. Accordingly, the X-analog voltage is an accurate representation of the stylus 64 X-coordinate position upon the graphic display board 12.

The X and Y-coordinate detection channels are similar, except that Y-channel computations are made during negative-going transitions of pulse train 40, whereas X-channel computations are made during positive-going transitions. When pulse train 40 is in a negative-going transition, diodes 26 and 10 are back biased, preventing X-channel current from flowing. During such a negative transition diodes 24 and 28 are forward biased, permitting a negative current to flow from ground through the series circuit comprising diode 24, a portion of resistive strip 16, a Y-tab 14 and X-tab 22 electrically interconnected by stylus tip wires 66, diode 28, resistors 32 and 36, and into pulse train generator 38.

Due to the flow of negative current, through the Y-channel path, a measurable negative voltage will exist between the cathode of diode 28 and ground. This voltage is primarily due to the voltage drop across that portion of resistive strip 16 through which current is flowing, the voltage drops across diodes 24 and 28 being negligible. Thus, this voltage is an accurate voltage analog of the Y-coordinate position of the stylus 64 upon the graphic display board 12 as represented by the Y-tab 14 with which the stylus is in contact. The Y-coordinate analog voltage can be monitored at the $V_y$ terminal 45, and will change in discrete steps as the stylus tip 65 is moved from one Y-tab 14 to a different Y-tab 14, due to the resulting step-like changes in resistance along resistive strip 16.

The X-analog voltage is inputted to X-analog comparator 42, where the voltage is compared with the voltage output of the Dx digital to analog converter 50. If the voltages are equal, the output of comparator 42 will be low, inhibiting AND gate 58. If the voltages are unequal, the output of comparator 42 is high, permitting AND gate 58 to pass clock pulses from clock line 61, provided that the enable input 63 to AND gate 58 is high. If these input conditions to AND gate 58 are met, the clock pulses will be inputted from AND gate 58, to Dx register 52, causing the register 52 to count the clock pulses. The digital output of the Dx register 52 drives the Dx digital to analog converter 50 output to higher analog voltage values with each successive count.

It is obvious that if Dx register 52 reaches its maximum count, it will reset to zero and begin a new up-count, causing the analog output of Dx digital to analog converter 50 to drop to zero, and then begin increasing in amplitude with each successive up-count of Dx register 52. When the analog output of Dx D/A converter 50 is equal in amplitude to the X-coordinate analog voltage amplitude, the output of X-analog comparator 42 will go low, inhibiting AND gate 58, preventing further inputting of clock pulses to Dx register 52, thus causing register 52 to stop counting. At this instant, the value of the digital output of Dx register 52 is representative of the X-coordinate position of stylus 64. The X-coordinate digital value is monitored from terminal 59.

The Y-coordinate analog voltage is inputted into the Y-analog comparator 44, where the voltage is compared with the analog voltage output of the Dy digital to analog converter 56. Computation of the digital representation of the Y-coordinate stylus 64 position upon the graphic display board 12 is identical to that required for the X-coordinate digital representation, with the exception being, of course, that Y-channel electronics including the Y-comparator 44, AND gate 60, Dy register 54, and Dy D/A converter 56 are utilized. The Y-coordinate digital signal is outputted on terminal 62.

The stylus 64 is not unlike an ordinary pencil or pen, except that its tip 65 is comprised of a number of fine spring wires 66, tightly bound within and protruding from the outer jacket 67 of the stylus 64. The diameter of the stylus tip 65 can readily be made, e.g., 0.03 inch, approximately the 1/32 inch diameter of a thin lead pencil. If the widths of the conductive paths 14, 22 and the resistive path 20 are 0.006 inch, for example, the use of stylus 64 with a 0.03 inch stylus tip 65 diameter, will yield an effective Y-coordinate resolution of ±0.02 inch, the X-coordinate resolution being infinite. The 0.02 inch resolution is derived by noting that if a 0.03 stylus tip 65 is moved from one such graphic board 12 path to another adjacent path, its total movement will be 0.018 inch (spacing between paths being in the illustration 0.006 inch), yielding the stated effective resolution. The resolution can readily be increased to ±0.01 inch, e.g., by merely reducing the widths and spacing of the conductive paths 14, 22 and resistive path 20 of the display board 12, and decreasing the diameter of stylus tip 65 accordingly.

As is known to one skilled in the art, if the graphical display board 12 is used to drive a 19 inch of larger CRT, a resolution of 0.02 inch is less than such CRT's spot size, Of course, the display board 12 and associated stylus 64 may be used in multiple other applications requiring greater or less resolution, the application dictating the appropriate dimensional design of the graphical display board apparatus.

As the stylus 64 is moved upon the surface of the graphic input board 12, the detection circuitry outputs the instantaneous X and Y coordinate positions of the stylus tip 65, the outputs being both analog and digitally coded. The electronic speed of the detection circuitry greatly exceeds the slow rate or speed which a person could impart to the stylus 64 in writing or drawing upon the surface of the graphic input board 12. Thus, the detection circuitry can readily detect any changes in the position of the stylus 64 upon the graphic input board 12. In summary, the resolution of the total system or apparatus is limited only by the line width of the plurality of conductors 14, 22 and resistive paths 20, the spacing therebetween, and the diameter of the writing stylus utilized.

Obviously, many modifications and variations of the present invention are possible in the light of the above teachings. It is, therefore, to be understood that, within the scope of the appended claims, the invention may be practiced otherwise than as specifically described.

What is claimed is:

1. A graphical input board for use with detection circuitry and a non-captive stylus having an electrically conductive tip, wherein the improvement comprises:

a rigid smooth printed circuit board including on one surface thereof:

a plurality of uniform parallel, equally spaced apart first resistive paths;

a plurality of first and second conductive paths, lying in like pairs between said resistive paths and evenly spaced therebetween;

said resistive and conductive paths being structured for bridging of any three consecutive paths by the width of the conductive tip of the stylus at any position on the operating surface of the board;

means for terminating like ends of said first resistive paths to provide unidirectional current flow to ground;

means for terminating each of said first conductive paths resistively and with unidirectionally opposite current flow to ground as that of said first resistive paths, wherein the resistive terminations are proportional, each to the other; and means for connecting said second conductive paths to said detection circuitry.

2. The apparatus of claim 1, wherein said means for terminating like ends of said first resistive paths to provide unidirectional current flow to ground comprises:

an individual third conductive path interconnecting like ends of said resistive paths; and a first diode with its anode connected to said third conductive path and its cathode connected to ground.

3. The apparatus of claim 1, wherein said means for terminating each of said first conductive paths resistively and with unidirectionally opposite current flow to ground as that of said first resistive paths, wherein the resistive terminations are proportional each to the other, comprises:

an individual uniform second resistive path interconnecting like ends of said first conductive paths, said first conductive paths being equally spaced therealong; and a second diode with its cathode connected to an end of said second resistive path, and its anode connected to ground.

4. A graphical input board system comprising:

a graphical input board;

a non-captive stylus having an electrically conductive tip; and detection circuitry including:

means for alternately driving calibrated positive and negative pulsed currents into said graphical board only when said stylus tip is in operative contact with said board;

means for detecting and outputting the positive and negative analog voltages developed upon said graphical board and representative of the instantaneous coordinate values respectively of said stylus tip upon said board; and means for converting the positive and negative analog voltages into digital representations and outputting the same.

5. The apparatus of claim 4, wherein said graphical input board comprises:

a rigid, smooth printed circuit board including on one surface thereof:

a plurality of uniform parallel, equally spaced apart first resistive paths;

a plurality of first and second conductive paths, lying in like pairs between said resistive paths and evenly spaced therebetween;

said resistive and conductive paths being structured for bridging of any three consecutive paths by the width of the conductive tip of the stylus at any position on the operating surface of the board;

means for terminating like ends of said first resistive paths to provide unidirectional current flow to ground;

means for terminating each of said first conductive paths resistively and with unidirectionally opposite current flow to ground as that of said first resistive paths, wherein the resistive terminations are proportional, each to the other; and means for connecting said second conductive paths to said detection circuitry.

6. The apparatus of claim 5, wherein said means for terminating like ends of said first resistive paths to provide unidirectional current flow to ground comprises:

an individual third conductive path interconnecting like ends of said resistive paths; and a first diode with its anode connected to said third conductive path and its cathode connected to ground.

7. The apparatus of claim 5, wherein said means for terminating each of said first conductive paths resistively and with unidirectionally opposite current flow to ground as that of said first resistive paths, wherein the resistive terminations are proportional each to the other, comprises:

an individual uniform second resistive path interconnecting like ends of said first conductive paths, said first conductive paths being equally spaced therealong; and a second diode with its cathode connected to an end of said second resistive path, and its anode connected to ground.

8. The apparatus of claim 7 wherein said means for alternatively driving calibrated positive and negative pulsed currents into said graphical board, when said stylus tip is in operative contact with said board, comprises:

a positive and negative pulse train generator;

third and fourth diodes;

first and second fixed resistors;

first and second variable calibrating resistors;

said first fixed and first variable resistors being connected in series between said pulse generator output and the anode of said third diode, the cathode of said third diode being connected to said second conductive paths, for driving positive pulsed currents thereto; and said second fixed and second variable resistors being connected in series between said pulse generator output and the cathode of said fourth diode, the anode of said fourth diode being connected to said second conductive paths, for driving negative current thereto.

9. The apparatus of claim 8, wherein said means for detecting and outputting analog voltages developed upon said graphical board and representative of the instantaneous coordinate values of said stylus tip upon said board comprises:

a first output terminal interwired to the anode of said third diode, for detecting and outputting the positive analog voltage representing a first instantaneous coordinate value; and a second output terminal interwired to the cathode of said fourth diode, for detecting and outputting the negative analog voltage representing a second instantaneous coordinate value.

10. Detection circuitry for use with a graphical input board and a non-captive stylus having an electrically conductive tip, wherein the improvement comprises:

means for alternately driving calibrated positive and negative pulsed currents into said graphical board only when said stylus tip is in operative contact with said board;

means for detecting and outputting the positive and negative analog voltages developed upon said graphical board and representative of the instantaneous coordinate values respectively of said stylus tip upon said board; and means for converting the positive and negative analog voltages into digital representations and outputting the same.

11. The apparatus of claim 10 wherein said means for alternatively driving calibrated positive and negative pulsed currents into said graphical board, when said stylus tip is in operative contact with said board, comprises:

a positive and negative pulse train generator;

first and second diodes;

first and second fixed resistors;

first and second variable resistors, each being used for calibration purposes;

said first fixed and first variable resistors being connected in series between said pulse generator output and the anode of said first diode, the cathode of said first diode being connected to said graphical board, for driving positive pulsed currents thereto;

said second fixed and second variable resistors being connected in series between said pulse generator output and the cathode of said second diode, the anode of said second diode being connected to said graphical board, for driving negative current thereto; and wherein said first and second diodes serve to isolate and direct positive and negative current flow.

12. The apparatus of claim 11, wherein said means for detecting and outputting analog voltages developed upon said graphical board and representative of the instantaneous coordinate values of said stylus tip upon said board comprises:

a first output terminal interwired to the anode of said first diode, for detecting and outputting the positive analog voltage representing a first instantaneous coordinate value; and a second output terminal interwired to the cathode of said second diode, for detecting and outputting the negative analog voltage representing a second instantaneous coordinate value.

13. A graphical input board system for determining the instantaneous coordinate position of a non-captive stylus having a conductive tip when in contact with the operating surface of the board comprising:

a plurality of parallel first conductive paths on said board;

means for driving a positive and negative pulse train into said conductive paths only when said stylus tip is in operative contact with said board;

first circuit means having portions parallel to said conductive paths for determining with infinite resolution the position of said stylus as to a first coordinate axis; and second circuit means having portions parallel to said conductive paths for determining in finite steps the position of said stylus as to a second coordinate axis;

said conductive paths and said parallel portions of said first and second circuit means being structured as a printed circuit with a combination of one each of said paths and said parallel portions of said first and second circuit means being bridged by the conductive tip of said stylus at any position on said printed circuit.

14. The graphic input board system of claim 13 wherein said first circuit means includes means for detecting an analog voltage representing the position of said stylus as to said first coordinate axis, and said second circuit means includes means for detecting an analog voltage representing the position of said stylus as to said second coordinate axis.

15. The graphical input board system of claim 14 also including means for converting said analog values to digital values.

16. The apparatus of claim 14, wherein said means for driving a positive and negative pulse train into said conductive paths comprises:

a positive and negative pulse train generator;

first and second diodes;

first and second fixed resistors;

first and second variable resistors, each of said variable resistors being used for calibration purposes;

said first fixed and first variable resistors being connected in series between said pulse generator output and the anode of said first diode, the cathode of said first diode being connected to said conductive paths, for driving positive pulsed currents thereto; and said second fixed and second variable resistors being connected in series between said pulse generator output and the cathode of said second diode, the anode of said second diode being connected to said conductive paths for driving negative current thereto.

17. The apparatus of claim 14 wherein said means for detecting analog voltages developed upon said graphical board and representative of the instantaneous coordinate values of said stylus tip upon said board includes means to output the analog voltages including:

a first output terminal interwired to the anode of a first diode of said means for driving a positive and negative pulse train into said conductive paths, for detecting and outputting the positive analog voltage representing a first instantaneous coordinate value; and a second output terminal interwired to the cathode of a second diode of said means for driving a positive and negative pulse train into said conductive paths, for detecting and outputting the negative analog voltage representing a second instantaneous coordinate value.

18. The apparatus of claim 13, wherein said portions of said first circuit means parallel to each of said parallel first conductive paths comprise uniform resistive paths and wherein said first circuit means also includes means for terminating said resistive paths to provide positive unidirectional current flow to ground.

19. The apparatus of claim 18, wherein said means for terminating said resistive paths to provide positive unidirectional current flow to ground, comprises:

an individual conductive path interconnecting like ends of said resistive paths; and a diode with its anode connected to said conductive path and its cathode connected to ground.

20. The apparatus of claim 13, wherein said portions of said second circuit means parallel to said first conductive paths comprise second conductive paths; and wherein said second circuit means also includes means for terminating each of said second conductive paths resistively and with negative unidirectional current flow to ground, wherein the resistive terminations of said second conductive paths are proportional each to the other.

21. The apparatus of claim 20, wherein said means for terminating each of said second conductive paths resistively and with negative unidirectional current flow to ground, comprises:

an individual uniform resistive path interconnecting like ends of said second conductive paths, said like ends of said second conductive paths being equally spaced therealong; and a diode with its cathode connected to an end of said resistive path, and its anode connect to ground.

* * * * *